US010173825B1

(12) United States Patent
Ercole

(10) Patent No.: US 10,173,825 B1
(45) Date of Patent: Jan. 8, 2019

(54) POWDER CONTAINER AND DISPENSER

(71) Applicant: Paul Anthony Ercole, Loveland, CO (US)

(72) Inventor: Paul Anthony Ercole, Loveland, CO (US)

(*) Notice: Subject to any disclaimer, the term of this patent is extended or adjusted under 35 U.S.C. 154(b) by 137 days.

(21) Appl. No.: 15/482,606

(22) Filed: Apr. 7, 2017

(51) Int. Cl.
| | | |
|---|---|---|
| *B65D 1/02* | (2006.01) | |
| *B65D 81/32* | (2006.01) | |
| *B65D 51/28* | (2006.01) | |
| *A47J 43/27* | (2006.01) | |
| *A23L 2/39* | (2006.01) | |

(52) U.S. Cl.
CPC ............ *B65D 81/3205* (2013.01); *A23L 2/39* (2013.01); *A47J 43/27* (2013.01); *B65D 1/0246* (2013.01); *B65D 51/2807* (2013.01)

(58) Field of Classification Search
CPC ............ B65D 81/3205; B65D 51/2807; B65D 1/2046; A23L 2/39; A47J 43/27
See application file for complete search history.

(56) References Cited

U.S. PATENT DOCUMENTS

| | | |
|---|---|---|
| 180,132 A | 7/1876 | Hoard |
| 1,715,757 A | 6/1929 | Hirtzler |
| 2,401,684 A | 6/1946 | Gumilar |
| 2,518,520 A | 8/1950 | Broun |
| 2,575,967 A | 11/1951 | May |
| 2,920,796 A | 1/1960 | Field |
| 3,410,444 A | 11/1968 | Morane |
| 3,450,310 A | 6/1969 | Dayton |
| 3,732,999 A | 5/1973 | Rounkles |
| 4,003,555 A | 1/1977 | Swartz |
| 4,779,722 A | 10/1988 | Hall |
| 4,804,101 A | 2/1989 | Heath |
| 4,818,114 A | 4/1989 | Ghavi |
| 6,372,270 B1 | 4/2002 | Denny |
| 6,443,096 B1 | 9/2002 | Prydie |
| 6,672,817 B2 | 1/2004 | Denny |
| 7,198,169 B2 | 4/2007 | Silk |
| 7,503,453 B2 | 3/2009 | Cronin et al. |
| 8,376,174 B2 | 2/2013 | Nerswick |
| 8,459,450 B1 | 6/2013 | Whitaker |
| 8,475,856 B2 | 7/2013 | Sheehan |
| 8,596,480 B2 | 12/2013 | Arjomand |
| 2003/0111359 A1 | 6/2003 | Seliga |
| 2004/0065576 A1 | 4/2004 | Deitz |
| 2005/0189362 A1 | 9/2005 | Muller |
| 2009/0230003 A1 | 9/2009 | Thiellier |
| 2013/0341443 A1 | 12/2013 | Stephenson |
| 2014/0069829 A1 | 3/2014 | Evans |
| 2014/0263471 A1 | 9/2014 | Gonzalez et al. |

FOREIGN PATENT DOCUMENTS

| | | |
|---|---|---|
| CN | 103318517 A | 9/2013 |
| EP | 2236433 A1 | 5/2012 |
| EP | 2995574 A1 | 3/2016 |
| WO | 1998029317 A1 | 7/1998 |
| WO | 2007055660 A1 | 5/2007 |
| WO | 2012149605 A1 | 11/2012 |
| WO | 2014056079 A1 | 4/2014 |

*Primary Examiner* — Jason K Niesz
(74) *Attorney, Agent, or Firm* — Keeley DeAngelo LLP; W Scott Keeley

(57) ABSTRACT

An example embodiment is a device for containing, transporting or otherwise holding a granular substance and for facilitating the mixture of the granular substance with a liquid. The device is typically used to mix powdered drink mixes into water contained in a screw-cap container such as a water bottle, for human consumption.

7 Claims, 7 Drawing Sheets

POWDER CONTAINER AND DISPENSER

TECHNICAL FIELD

The presently disclosed subject matter relates to devices for holding powdered drink mix, and in particular, a reusable container for containing, carrying, dispensing and mixing powdered drink mix with liquid in a common screw-top liquid container.

BACKGROUND

Concentrated powders are commonly mixed into liquid containers for purposes of flavoring or fortifying beverages. Most commercially produced liquid containers, including water bottles, have openings that are too small to receive poured powder. This prevents mixing of powders, including powdered medicine, with liquid in those containers.

Drink mixes, including protein powders, nutritional supplements, flavor enhancers and energy-drink supplements, are commonly mixed with water. Dry mixes are often preferred to pre-mixed liquids because a dry mix has a longer shelf life than a premixed liquid. Other granular substances include powdered baby formula or granular snack foods.

Currently available powder drink-mix containers are sold in sealable pouches, spouted pouches or rigid containers, which tend to be large; usually more than two quarts in volume. Bulky containers are difficult to pack in luggage and inconvenient to carry. Powder stored in a bag is easier to pack but can burst. Pre-packaged, small volumes are available but are proportionally more expensive.

Powder substances are commonly poured into a container or dispensed out of a container through an opening, or mouth. Currently available, funnel-shaped powder containers, or containers that narrow at the mouth, are designed to fit inside the mouth of a typical beverage container. Powder is difficult to transfer through narrowing openings. Wider openings facilitate a powder's transfer.

Mechanisms for connecting containers and making seals are in the field of the present invention. A detent is a mechanism that temporarily keeps one part in a certain position relative to that of another, and can be released by applying force to one of the parts An O-ring is an annular form of often pliable material used as a seal against a mated, form to prevent the flow of fluid. A gasket is a pliable material fitted to an opening between two rigid parts to form a fluid-tight seal.

The present disclosure refers to apparatus that conveys granular material. A spout is a pipe, tube, or liplike projection through or through which a liquid is conveyed or discharged. In other embodiments, a spout is a trough or shoot for discharging or conveying grain, flour, or a granular substance.

SUMMARY

The presently disclosed subject matter includes a description of the components or portions of a device for containing and transporting, or otherwise holding, a granular or powder-based substance (powder) in a receptacle, and facilitating the mixture of the powder with a liquid, typically with water in a common screw-top container, and typically for human consumption.

One skilled in the art understands that a granular substance, as described in the above context, may be a flavoring or a protein mix or the like. The present disclosure refers to such substances used for mixing into beverages as powdered drink mix or other consumable powders, though other textured substances may be used.

In the exemplary embodiment a device for holding powder is provided that is composed of three detachable components; a screw-cap, a detachable top half, and a detachable bottom half. The three detachable components are constructed from a resilient material that can be produced in a variety of castable polymers that are appropriately flexible and available in a variety of colors to accommodate various aesthetics.

A water-tight state is maintained in the receptacle's interior when the device is sealed by means of its two gaskets: a O-ring between the screw cap and top half of the device; and a connection gasket between the top and the bottom halves of the device.

The screw-cap portion of the device is cylindrical and threaded with a flat upper portion that allows the device to be positioned upright on a flat surface when the device is not in use. The bottom half of the device is intended to be disengaged from the top half and then filled with powder. Measurement markings on the bottom half of the device assist the user in filling. The bottom half may be filled by use of a utensil or it may be used as a scoop. The top half is then re-engaged with the bottom half to close the container.

The top-half portion of the device comprises a spout; a spout gasket; a carabiner hoop; a planar surface that can accommodate a logo or symbol; a connection point to facilitate the connection of the two halves of the device; and a connection gasket to seal the two halves of the device. The shape of the top half of the device is in the form of a relatively wide section at the opening of the receptacle, and a progressively narrowing section of the receptacle nearing the spout.

The connection point is a detent, comprised of a protuberance and a receptacle for receiving the protuberance. In an example embodiment the protuberance is wedge-shaped, making it easier to engage the detent than to disengage. In other words the detent requires less force to engage the two halves of the container and requires more force to disengage the two halves of the container.

The spout is designed to engage with a wide variety of liquid containers for dispensing powder into the liquid container. In one embodiment a stepped, tapered form fits over the outer threads of the mouths of varying sizes of commonly available liquid containers such as water bottles. A gasket is configured to make a tight seal between the device and the top portion of a commonly available liquid container. In combination the O-ring and spout are configured to provide an appropriate fit and seal between the powder container and a liquid container.

The top half of the device has raised surfaces on two sides that serve as grips that facilitate manipulation of the device while mixing or shaking its contents.

The carabiner hoop is adjacent to the spout on the exterior top half of the device. The carabiner hoop is designed to connect to a carabiner clip which can attach to various personal items such as gym bags, belt loops or key rings.

The exterior top half of the device includes a planar surface to accommodate a team logo or picture for the personal customization of the device.

The bottom half of the device consists of a measuring cup that is designed to hold 65 to 85 CC of powder. One skilled in the art will understand that changing the scale of the device will provide a new device holding more than 85 CC or less than 65 CC. The bottom half of the device is made of translucent material with visible measurement markings punched onto its exterior. The measurement markings facilitate measurement of powder into the receptacle. The bottom half of the device also has at least three raised surfaces on at least three sides that serve as grips that facilitate manipulation of the device while mixing or shaking its contents.

A top half of the device is connected to a bottom half of the device. The top half of the device has a spout that is an extruded hollow cylinder with an annular flat portion proximal to the bottom of the cylinder surrounding the outside of the cylinder; and an annular groove on the inside and proximal to the top of the cylinder for receiving an O-ring that is intended to meet with the mouth of a bottle, the annular flat portion and the annular groove formed into the shape of the top half of the device. The top half of the device further comprises an offset band that widens the bottom portion of the top half of the device for the purpose of receiving the bottom half of the device.

The offset band houses a gasket that makes a seal between the top and bottom halves of the device.

Two connection points are detents comprising either protuberances or receptacles for the protuberances and are located on both top half and bottom halves of the device; one pair is located on the front and one pair is located on the back of the device.

The connection points on each half of the device are designed as interlocking protuberances and receptacles. Interlocking of a detent occurs when the top and bottom halves are pressed together, and unlocking occurs when the detent is pressed in to flexibly release it.

One skilled in the art will understand that mated connection points may include any combination of detents in either half of the device so long as detents meet as the two components mate.

DETAILED DESCRIPTION OF THE DRAWINGS

Figure 1:
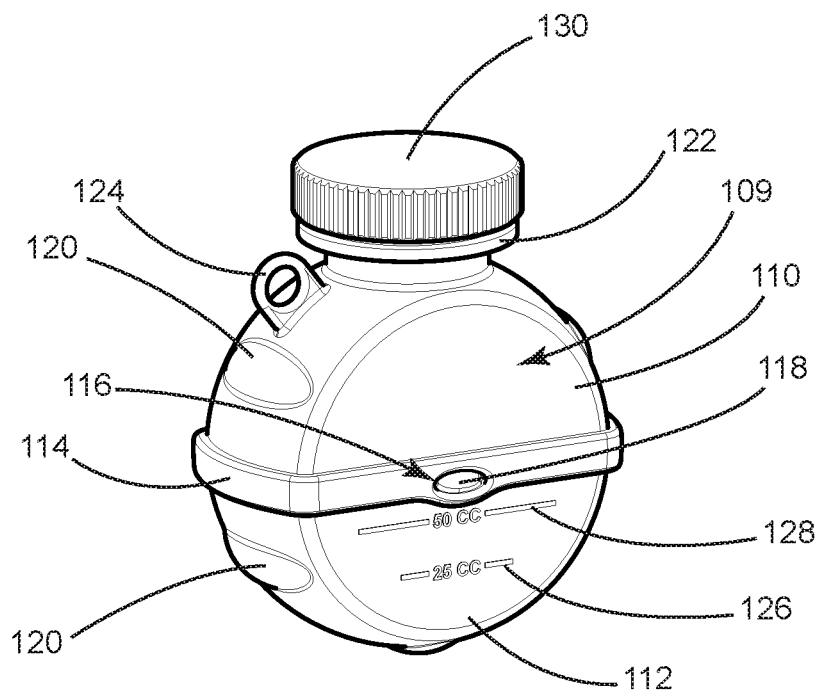
FIG. 1 is a perspective front view of exemplary embodiments of the device depicting its components in a closed state.
Figure 2:
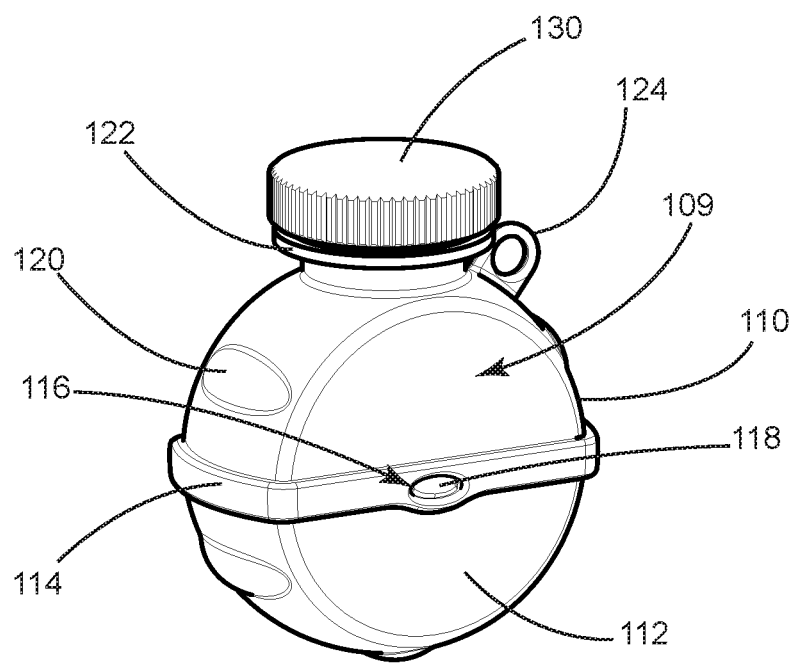
FIG. 2 is a perspective view of exemplary embodiments of the device depicting its components in a closed state
Figure 3:
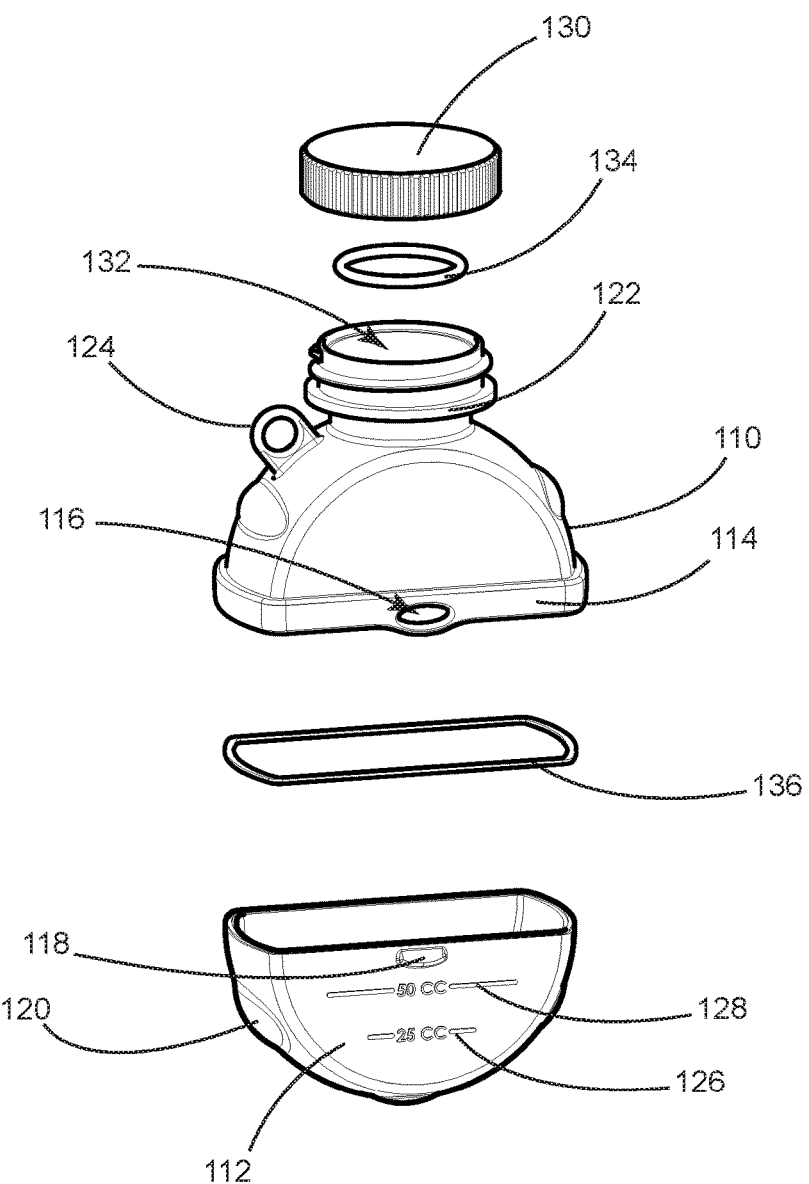
FIG. 3 is an exploded view of an exemplary embodiment of the device depicting its components in an open state.

FIG. 1, FIG. 2 and FIG. 3 are perspective front, rear and exploded views respectively of an exemplary embodiment of the device 100 comprised of a top half 110, including a planar surface 109 that can accommodate a logo or symbol. The top half 110 further includes an offset band 114 for holding an internal gasket 136 (FIG. 3). A spout 122 is engaged with the top half and surrounds the mouth 132 (FIG. 3). The spout 122 is intended to mate with a screw cap 130. The top half further includes a carabiner hoop 124 and the screw cap 130 that covers the mouth 132 (FIG. 3).

A detent FIG. 1, 116 is part of an interlocking system that receives a protuberance 118 that is part of the bottom half 112 of the device. One skilled in the art will understand that protuberances and receptacles may be interchanged in an interlocking system such as this. Both bottom and top halves of the device include grip texturing 120. The bottom half 112 of the device further includes measurement labels 126 and 128.

Referring specifically to FIG. 2 a perspective back view of an exemplary embodiment of the device 100 is shown. The top half 110 includes a planar surface 109 that can accommodate a logo or symbol.

Referring specifically to FIG. 3 a perspective, front, exploded view of an exemplary embodiment of the device 100 is displayed. The top half 110 includes the screw cap 130; the spout 122 and spout opening 132; the O-ring 134; the carabiner hoop 124; the planar surface 109 that can accommodate a logo or symbol; the offset band 114; and the receiving portion of the detent 116 of the interlocking mechanism. The bottom half 112 includes the protuberance 118 which is a portion of the detent that locks into the receiving portion 116. One skilled in the art will understand that a protuberance 118 may have a smooth, rounded side that allows sliding engagement with the receiving portion of the detent 116, and a cut side that stops the receiving section, preventing unintended disengagement of the device's halves. Measurement labels 126 and 128 show portions in cubic centimeters (cc). A connection gasket 136 sits between the top and bottom halves.

Figure 4:
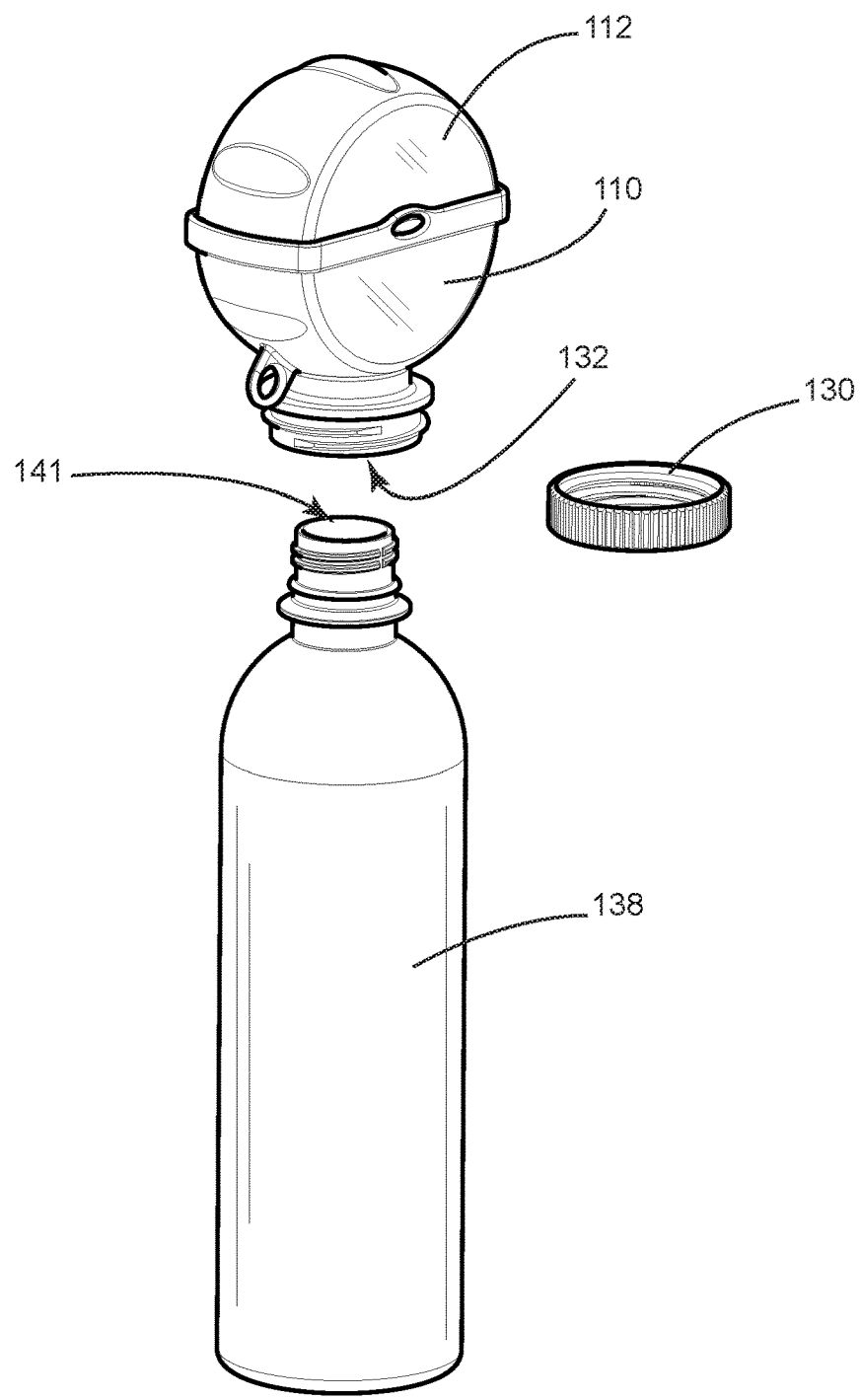
FIG. 4 is a perspective view of an exemplary embodiment of the device in relation to a liquid container.

FIG. 4 is a perspective view of an exemplary embodiment of the device, including the top half 110, the bottom half 112, the screw cap 130, and the spout opening to the receptacle 132, in relation to a commonly available liquid container 138 with a bottle mouth 141. FIG. 4 is a perspective view of the configuration that is depicted in orthographic view in FIG. 5.

Figure 5:
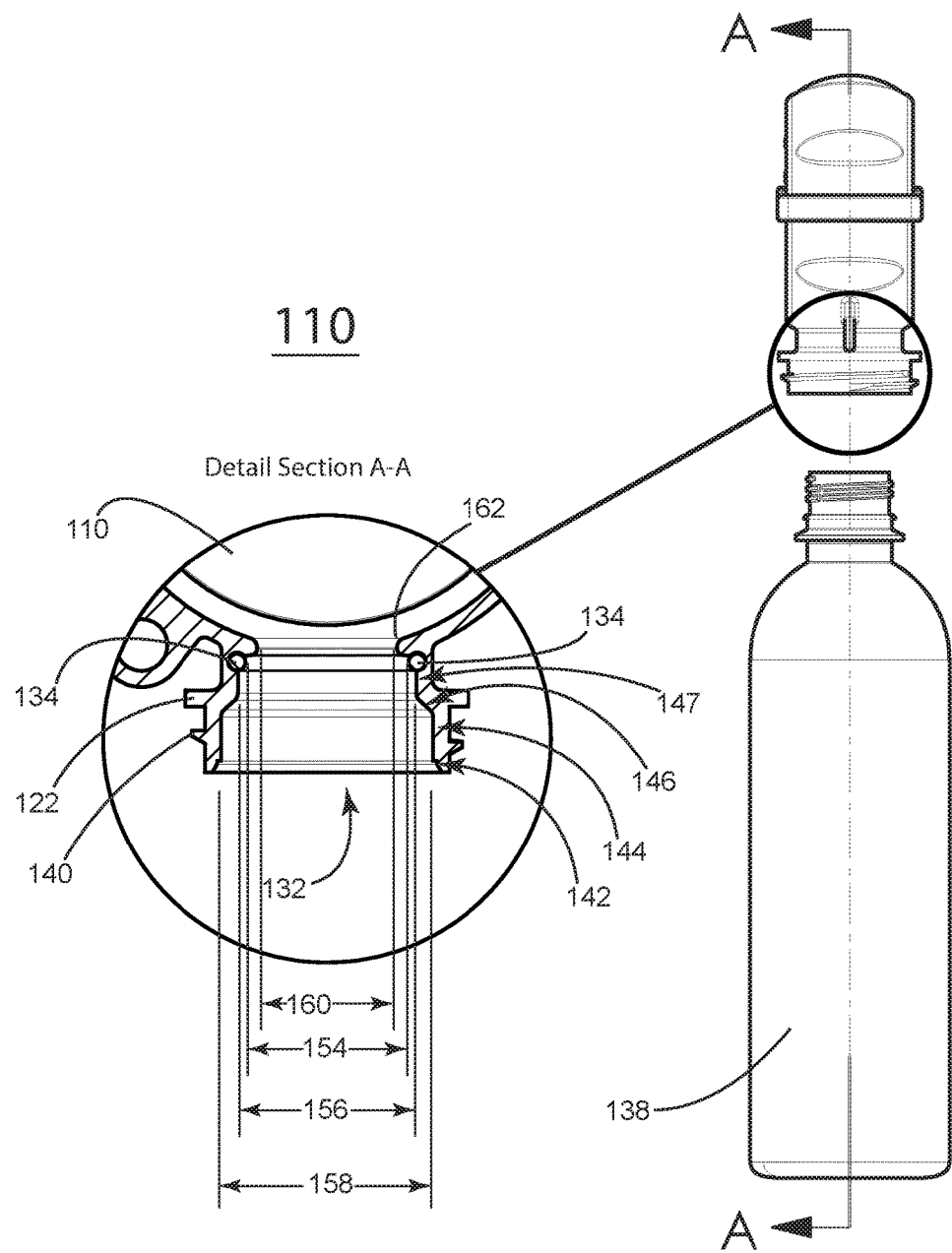
FIG. 5 is an orthographic, section view of an exemplary embodiment of the device in relation to a liquid container.

FIG. 5 is an orthographic view with a cross-section, detail view (section A-A) of the spout 122 on the top half 110 of the device. A commonly available liquid container 138 is separated from the device to illustrate the difference between FIG. 5 and FIG. 6 wherein the liquid container 138 is engaged with the device. The mouth FIG. 5 132 of the spout 122 is formed of an interior bevel 142 that narrows the mouth 132 and is a surface that is contiguous with a vertical interior surface 144 that meets another bevel 146 that further narrows the mouth 132 and is contiguous with a second vertical surface 147 that extends downward to a O-ring 134. The widest opening 158 of the mouth 132 is between 1.2" and 1.3" in diameter. A relatively narrower portion 156 is formed by the narrowing of the two bevels 142 and 146 and is between 0.96" and 1.125" in diameter. The O-ring 134 further narrows the mouth 132 of the device dimension 154 that is between 0.9" and 0.975" in diameter. A collar 162 extends into the bottom to partially close the mouth 132. The collar is intended to be narrower than most liquid containers so as to provide a stop against which the motion of the device cannot continue further than necessary onto the mouth of a liquid container. The dimension of the narrowest portion 160 of the mouth 132 is between 0.875" and 0.9" in diameter. The spout further comprises thread 140 that engages the screw cap 130 and is located on the exterior surface of the spout 122.

Figure 6:
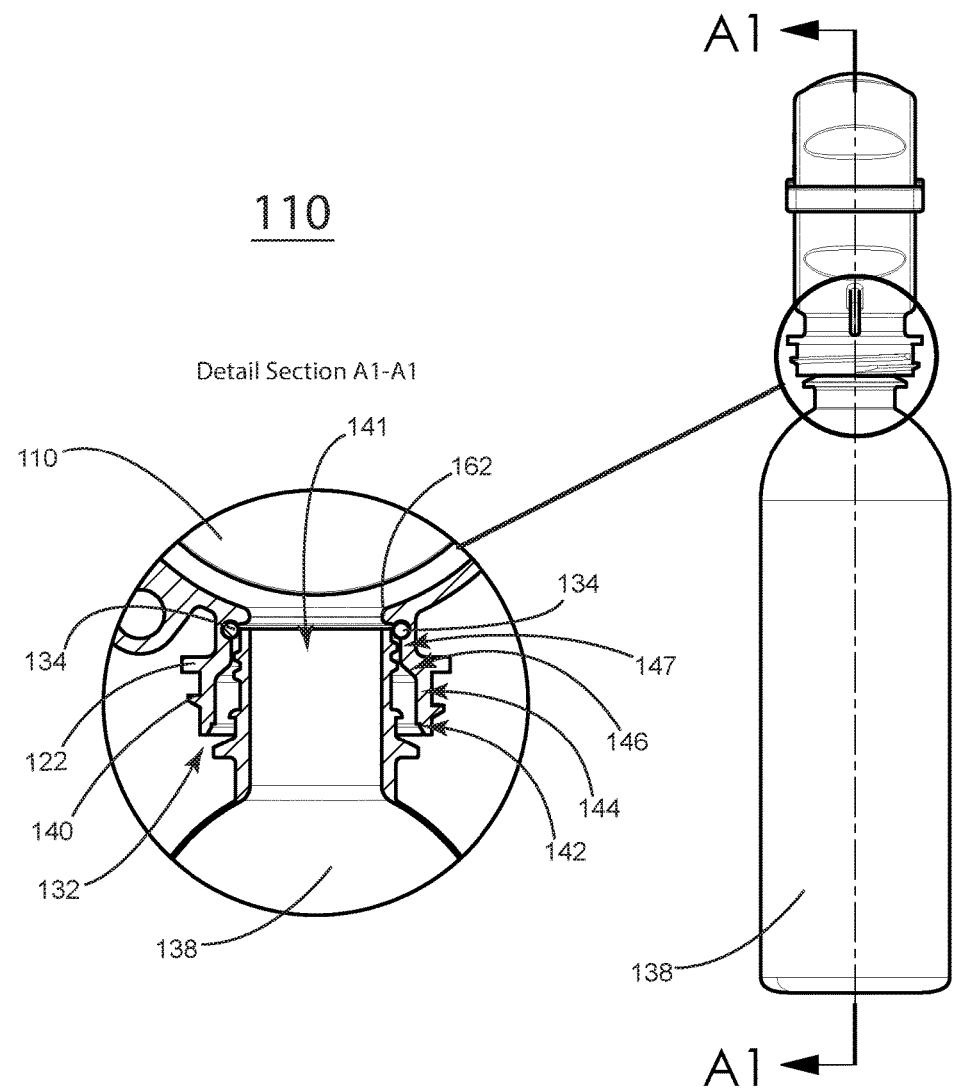
FIG. 6 is an orthographic, section view of an exemplary embodiment of the device connected to a liquid container.

FIG. 6 is an orthographic, side view displaying a cross-section, detail view (section A1-A1) of the spout 122 on the top half of the device 110. A commonly available liquid container 138 is engaged with the spout 122, wherein the mouth 141 of the liquid container 138 is engaged with the mouth 132 of the spout 122. A detail section A1-A1 depicts the manner in which the mouth 141 of the bottle 138 engages with the spout 122. The mouth 141 of the liquid container 138 is engaged such that the narrowest portion 162 of the spout 122 provides a stop and the spout gasket 134 is engaged with at least a portion of the mouth 141 of the liquid container 138. The specific dimension range described in FIG. 5 allows for most liquid container bottles to engage with the spout 122 in a manner that creates a sufficient seal to prevent spilling of the contained powder when transferring the powder into the liquid container 138.

Figure 7:
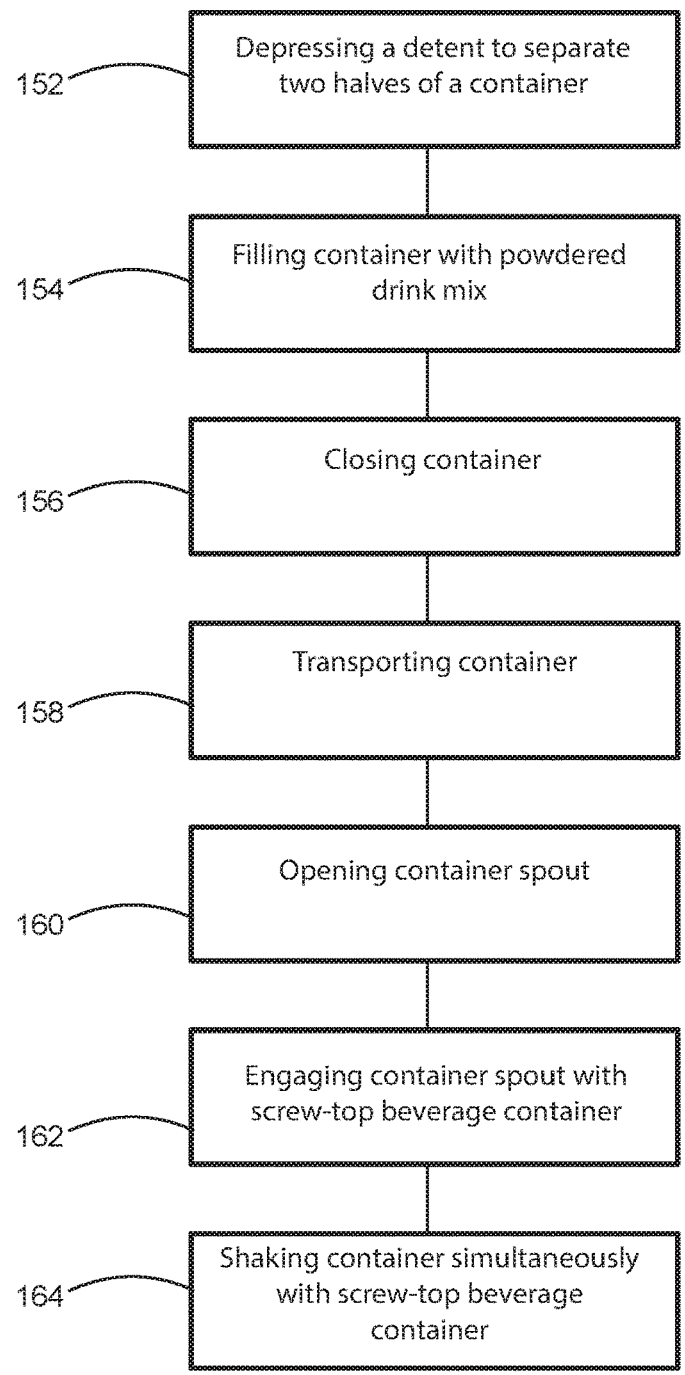
FIG. 7 is a diagram describing a method for transporting and mixing powdered drink mix with bottled liquid.

Referring to FIG. 7 a method 150 for storing, transporting and transferring powdered drink mix into a water bottle using the aforementioned apparatus, includes the steps of depressing the aforementioned detent to separate the two halves of the aforementioned container 152. The following step 154 involves filling one half of the aforementioned container with powdered drink mix. The following step 156 involves closing the container followed by step 158, transporting the container. Once transported, the next step includes opening the container spout 160 and then following step 162 which entails engaging the container spout with the opening of a screw-top beverage container. In the final step, shaking the combination container with powdered drink mix and screw-top beverage container 164, transfers the powdered drink mix into the liquid in the screw-top beverage container.

One of ordinary skill in the art will recognize that additional embodiments are also possible without departing from the teachings of the presently-disclosed subject matter. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and can be made without departing from the spirit and scope of the presently-disclosed subject matter.

The invention claimed is:

1. An apparatus and method for containing, transferring and mixing granular substances with liquid in bottles with various sized openings, the apparatus comprising:
   a top half and a bottom half; and
   a gasket between said top and bottom half; and
   a detent for removably engaging said top half and said bottom half; and
   the top half comprising:
      a receptacle for receiving a protuberance; and
      a spout; and
      a cap for said spout; and
      said spout being tapered; and being relatively wider at an opening of the spout and relatively narrower proximal to the interior of the top half; and
      said spout having an O-ring fixedly engaged with an interior side of the spout; and
      being proximal to the narrow portion of the taper; and
   the bottom half comprising:
      a protuberance for mating with said receptacle; and
      a translucent material; and
      having marking denoting measurements of volume held by the bottom half of the container; wherein
   a volume of granular substance may be measured and placed in the bottom half, the bottom half engaged with the top half and held fast by the detent; and the closed container with closed spout sufficient for storing and transporting said granular substance; and said spout, when opened, being able to engage with a variety of bottle openings by receiving bottle openings into the wider portion of the taper and sealably engaging the bottle opening by the narrowing taper; and said O-ring making a seal against the bottle opening.

2. The apparatus of claim one further comprising:
   a gasket between said top and said bottom half of said apparatus.

3. The apparatus of claim one wherein:
   said spout comprises a three-stage taper having a wider portion, a narrower portion, at least one O-ring having an outside and an inside diameter, and a stop; and
   said at least one O-ring residing between said narrower portion and said stop; and
   said wider portion proximal to the spout opening; and
   said wider portion being between 1.2" and 1.3" in diameter; and
   said wider portion narrowing to a narrower portion that is between 0.96" and 1.125" in diameter; and
   said narrower portion having at least one groove to receive said at least one O-ring; and
   said at least one O-ring having an inside diameter that is between 0.9" and 0.975" in diameter; and
   said stop located between said at least one O-ring and the interior of the top half of the container having a diameter that is between 0.875" and 0.9" in diameter; wherein common screw-cap bottles used to contain beverages having various sized openings, fit into the tapered spout; wider screw-cap bottle openings fitting into the wider portion, narrower screw-cap bottle openings fitting into the narrower portion and narrowest screw-cap bottle openings fitting into the O-ring and resting against the stop.

4. The apparatus of claim one further comprising:
   a flange surrounding said spout; wherein
   said flange is sufficiently wide to allow the user to grip the flange while holding the screw-cap bottle to facilitate shaking the apparatus in combination with the screw-cap bottle to transfer the granular substance into the screw-cap bottle.

5. The apparatus of claim one further comprising:
   a second O-ring residing in said spout; and
   said spout having a second groove that is located between said wider portion and said narrower portion; and
   said second O-ring fixedly engaged in said second groove; wherein
   the second O-ring creates a water-tight seal between a wider screw-cap bottle opening and said spout.

6. A method for transporting and transferring powdered drink mix into a water bottle comprising:
   providing the apparatus of claim one; and
   depressing a detent to separate two halves of a container; and
   filling the bottom half of a container with powdered drink mix; and
   closing the container; and
   transporting; the combination container and powdered drink mix; and
   opening the container spout; and
   engaging the container spout with the opening of a screw-cap beverage container; and
   shaking the container and screw-cap beverage container combination; wherein powdered drink mix is transferred into the screw-cap beverage container upon shaking the combination container and screw-cap beverage container.

7. The method of claim six further comprising
   removing the container from the screw-cap beverage container; and re-using the container by repeating the steps in the method of claim six.

* * * * *